WIRED BROADCASTING SYSTEMS AND APPARATUS THEREFOR

Filed Nov. 27, 1964 2 Sheets-Sheet 1

INVENTORS
Leonard S. Palmer
Daniel H. Smart
BY Watson, Cole, Grindle & Watson
ATTORNEYS Sept. 12, 1967 L. S. PALMER ETAL 3,341,652

WIRED BROADCASTING SYSTEMS AND APPARATUS THEREFOR

Filed Nov. 27, 1964 2 Sheets-Sheet 2

INVENTORS
Leonard S. Palmer
Daniel H. Smart
BY
Watson, Cole, Grindle & Watson
ATTORNEYS United States Patent Office 3,341,652

Patented Sept. 12, 1967

3,341,652

WIRED BROADCASTING SYSTEMS AND APPARATUS THEREFOR

Leonard Sidney Palmer, West Wimbledon, and Daniel Henry Smart, Coulsdon, Surrey, England, assignors to Communications Patents Limited Filed Nov. 27, 1964, Ser. No. 414,117

Claims priority, application Great Britain, Dec. 5, 1963, 48,077/63

5 Claims. (Cl. 178—5.2)

Figure 1:
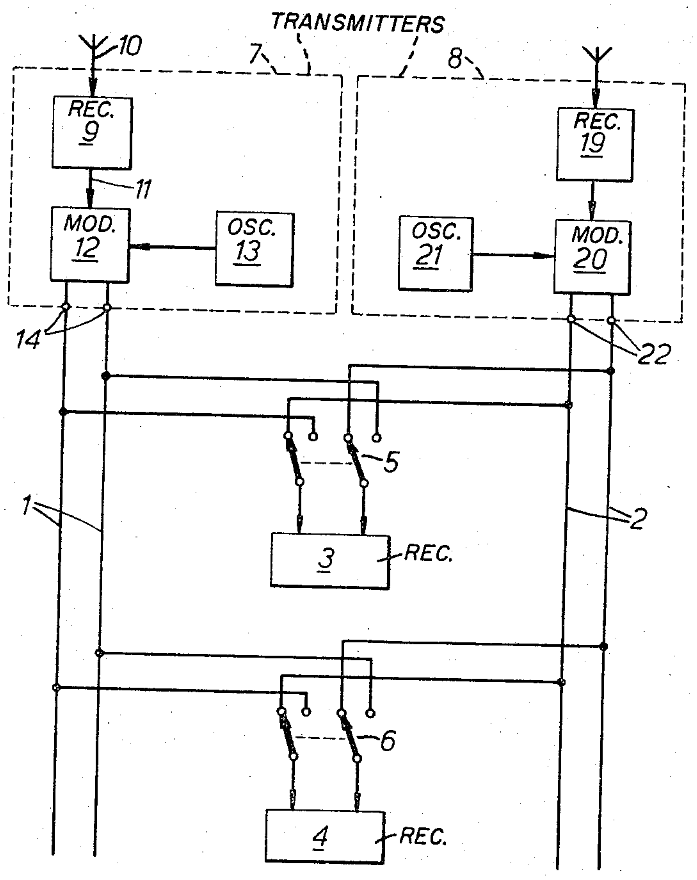

This invention relates to wired broadcasting systems and apparatus for use therein and is particularly concerned with such systems and apparatus which pertain to color television.

An object of this invention is to enable color television signals which are being radiated by a radio transmitter of a regular television service to be used for energizing the conductive network of a wired broadcasting system in a manner which reduces patterning in the pictures which are produced with the aid of said signals being distributed by this network, in particular to reduce patterning due to the beating of carrier waves adopted for the purpose of effecting this distribution which may arise in receivers which produce appreciable fourth-order distortion products in signals which they handle.

According to a first aspect of the invention there is provided a wired broadcasting system pertaining to color television wherein a transmitting apparatus which serves to energize a conductive network of the system produces and applies to the said network a modulated carrier wave brightness information component and a suppressed carried wave color information component, the frequency of said carrier waves differing from each other by an odd multiple of half the line scanning frequency, and means are included which determine that the frequency of the carrier wave of the brightness information component corresponds to a whole multiple of the line scanning frequency plus or minus an odd multiple of one quarter of the frame scanning frequency, whereby the beats of these carrier waves or their harmonics which have frequency differences of nearly an even multiple of the line scaning frequency differ in frequency by an odd multiple of half the frame scanning frequency and the visible effects of these beats in a picture produced with the aid of said components is reduced.

The invention also provides according to a second aspect a color television transmitting apparatus for energizing a conductive network of a wired broadcasting system which comprises means for producing an electric wave at a frequency which corresponds to a whole multiple of the line scanning frequency plus or minus an odd multiple of one quarter of the frame scanning frequency, means for modulating said electric wave in accordance with brightness information signals to produce a modulated carrier wave brightness information component, means for modulating said electric wave in accordance with suppressed carrier wave signals pertaining to color information and having a frequency corresponding to an odd multiple of half the line scanning frequency to produce a suppressed carrier wave color information component, and means for applying said components to the conductive network, whereby the beats of these carrier waves or their harmonics which have frequency differences of nearly an even multiple of the line scanning frequency differ in frequency by an odd multiple of half the frame scanning frequency and the visible effect of these beats in a picture produced with the aid of said components is reduced.

Figure 2:
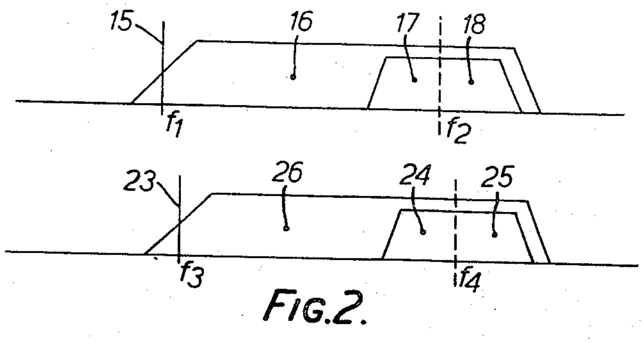
Figure 3:
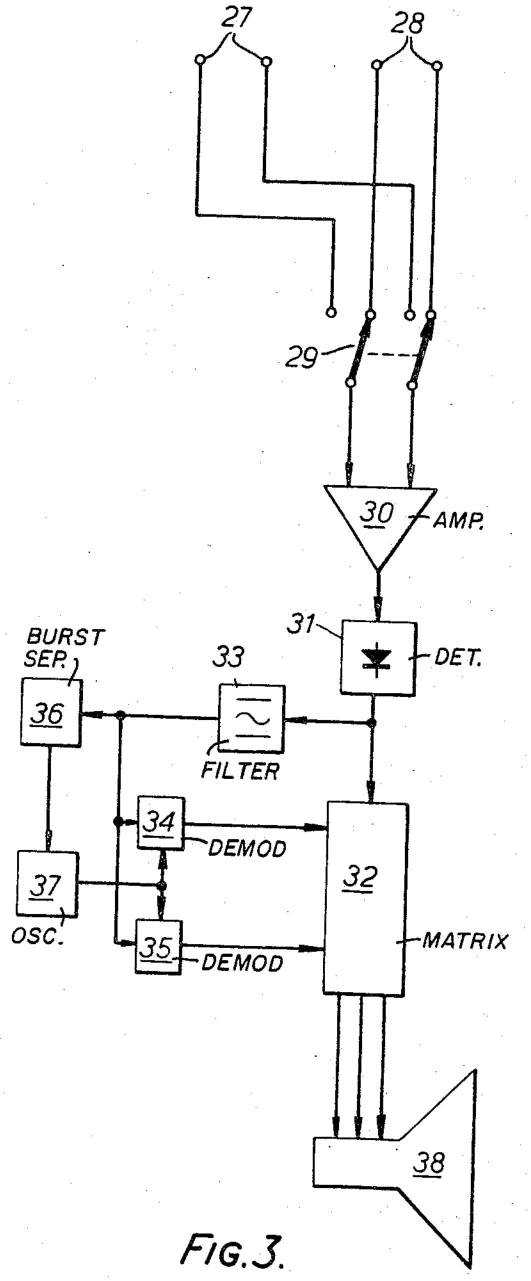

To facilitate a proper understanding of the invention it will now be described, merely by way of example, with reference to the accompanying drawings, wherein:

FIG. 1 is a block diagram of a wired broadcasting system, including its transmitting and receiving apparatus, in accordance with the present invention, FIG. 2 is a diagram showing the frequency relationships of signals involved in the operation of the system shown in FIG. 1, and FIG. 3 is a detail block schematic diagram of a receiving apparatus suitable for use, in the system shown in FIG. 1.

The conductive network of the wired broadcasting system shown in FIG. 1 comprises two signal paths, 1 and 2, for example two pairs of conductors of a suitable multipair cable. Each of these paths pertains to the distribution of color television signals in respect of different transmissions each of which is in respect of different program material. These paths serve to distribute the television signals from a central station to a plurality of subscriber's receivers, two such subscriber's receivers being indicated in the drawing at 3 and 4 respectively. Each of these receivers is associated with a program selecting switch, 5 and 6 respectively, whereby its input circuit can be connected electrically with either of the two signal paths at will in order to accept signals of the wanted program.

The central station equipment comprises two sets of transmitting apparatus, 7 and 8, for the purpose of energizing the signal paths 1 and 2 respectively. The transmitting apparatus 7, in respect of the first of the two transmissions, comprises a radio wave receiving apparatus 9 which, through the intermediary of an aerial 10, is adapted to receive radio wave color television signals of a regular television service, it being assumed for the purpose of the following description that this service is being operated according to the 625 line N.T.S.C. system standard. The receiver is arranged and adapted to extract from the received radio signals brightness information signals, which include color bursts and synchronizing signals, and suppressed carrier wave color information signals. These extracted signals are applied by way of a line 11 to a balanced modulator 12. There is also applied as an input to this balanced modulator 12 an electric wave from a highly stable carrier wave oscillator 13 which conveniently comprises an oven-controlled crystal drive so as to provide a carrier wave having a frequency which corresponds within a few cycles per second to the desired frequency.

The output from the modulator 12 is fed to terminals 14 for energizing the signal path 1 of the network and this output comprises, as shown in FIG. 2, an amplitude modulated carrier wave brightness information component having a carrier wave 15 of frequency $f_1$ which corresponds to a multiple of the line scanning frequency P plus or minus an odd multiple of one quarter of the frame scanning frequency F of the television signals. This frequency may be expressed as $$nP \pm \frac{(2v-1)F}{4} \text{ c.p.s.}$$

where $n$ and $v$ are any numbers. In practice $n$ may be 346 and $v$ may be 1, the resulting frequency being 5406.2625 kc./s. The modulation of the carrier wave 15 by the brightness information signals occupies the frequency band 16. Said output also comprises a double sideband suppressed carrier color information component, these sidebands being indicated at 17 and 18. The frequency of this suppressed carrier wave is represented by $f_2$ (approximately 9830 kc./s. in the present example). The difference between the frequencies $f_1$ and $f_2$ is the same as that adopted for the television line standard concerned, that is approximately 4430 kc./s., which difference results in the present instance in the sidebands 17 and 18 lying within the frequency band 16. However, in some cases the differences between the frequencies $f_1$ and $f_2$ may be such that the sidebands 17 and 18 lie outside the frequency band 16 or partially therein as may be desired or convenient. In any case the frequencies $f_1$ and $f_2$ are arranged to differ by an odd multiple of half the line scanning frequency of the television line standard concerned.

By thus arranging that the frequency $f_1$ corresponds to a whole multiple of the line scanning frequency plus or minus an odd multiple of one quarter of the frame scanning frequency the beats of these carrier waves or their harmonics which have frequency differences of nearly an even multiple of the line scanning frequency differ in frequency by an odd multiple of half the frame scanning frequency and the visible effect of these beats on the received picture appears as a dot-pattern, such dot-pattern being less visible to the viewer. In order that the advantages of the present invention may be retained without undesired side-effects occurring it is preferred that $\nu$ should lie within the range 1–11 inclusive and that the frequency $f_1$ should be maintained stable to within $\pm 4$ c.p.s.

The transmitting apparatus 8 pertaining to the second transmission is similar to the transmitting apparatus 7. In general, the frequencies of the carrier waves of the brightness and color information components being applied by this transmitting apparatus 8 to the signal path 2 differ from the frequencies of the carrier waves of the corresponding components applied by the transmitting apparatus 7 to the signal path 1 by about a few kilocycles per second. However, if the isolation between the two signal paths 1 and 2 is very high the various carrier waves produced by the two sets of transmitting apparatus 7 and 8 may be approximately the same i.e. within a few cycles per second. The apparatus 8 comprises a radio receiver 19, a balanced modulator 20 and a highly stable oscillator 21, which are the equivalents of the corresponding devices 9, 12 and 13 of the apparatus 7, and thus provides at terminals 22 for application to the signal path 2 signals which, as shown in FIG. 2, comprise an amplitude modulated carrier wave brightness information component having a carrier wave 23 at frequency $f_3$ and a double sideband suppressed carrier color information component having a suppressed carrier at frequency $f_4$ and sidebands which are indicated at 24, 25. (The difference between $f_1$ and $f_3$ and between $f_2$ and $f_4$ is shown exaggerated in the drawing.) The modulation of the carrier wave 23 by the brightness information signals of this second transmission occupy the frequency band 26.

The television receiver shown in FIG. 3 comprises two pairs of input terminals, 27 and 28, which are adapted to be connected to the conductors of the signal paths 1 and 2 respectively. A program selection switch 29 (5 or 6 in FIG. 1) enables the input circuit of an amplifier 30 to be connected at will to either of the paths 1 or 2 according to which of the two transmissions it is desired to receive. The amplified signals obtained from this amplifier 30 are applied to a detector 31 which provides an output comprising the brightness and color information signals of the transmission and this output is applied to a matrix 32 and also to a band pass filter 33, the latter passing only the color information signals which are fed to two demodulators, 34 and 35 and to a color burst separator 36. The latter serves to separate from the signals applied thereto synchronizing signals by which the frequency and phase of a reinsertion carrier, produced by an electric wave oscillator 37, are controlled. The reinsertion carrier obtained from this oscillator 37 is fed to the demodulators 34 and 35 to effect demodulation of the two quadrature components, which components are applied to the matrix 30 to produce, from the three signals applied to it, signals appropriate for controlling a cathode ray picture tube 38.

A monochrome receiver may be connected to the system shown in FIG. 1 to receive the color transmissions in black and white, in which case the employment of the present invention is equally effective in reducing visible patterning of the picture produced by such a receiver.

A particular advantage of the invention is the fact that the linearity requirements of amplifiers both in repeaters which lie in the signal path between the transmitting and receiving apparatus and in the receiving apparatus itself may be less stringent in some respects than when the brightness and color carrier frequencies are not arranged in accordance with the present invention.

It is usual practice in wired television systems to transmit the sound accompaniment of the picture as audio frequency signals over a conductive path of the network, that is to say without the use of a carrier wave, and it is deemed unnecessary to present details of this known technique in this specification.

What we claim is:

1. In a wired color television broadcasting system having a predetermined line scanning frequency which system includes a transmitter for energizing a corresponding conductive network of the system by producing and applying to said network a modulated carrier wave brightness information component and a suppressed carrier wave color information component, the frequencies of said carrier waves differing from each other by an odd multiple of half the line scanning frequency, the provision of frequency control means for establishing the frequency of the carrier wave of the brightness information component at a whole multiple of the line scanning frequency plus or minus an odd multiple of one quarter of the frame scanning frequency, the beats arising due to second and fourth order distortions of these carrier waves thereby occurring at frequencies such that in a picture produced with the aid of said brightness and color information components said beats form a dot pattern which is less discernible than other patterns in which said beats would otherwise appear with different carrier waves.

2. In a wired broadcasting system according to claim 1, the provision of a plurality of conductive networks and a corresponding plurality of sets of transmitting apparatus, each set of transmitting apparatus being arranged to energize a corresponding one of each of said plurality of conductive networks.

3. In a color television transmitting apparatus operated on a predetermined line scanning frequency for energizing a conductive network of a wired broadcasting system, which apparatus comprises modulator means for modulating an electric wave in accordance with a brightness information signal and also in accordance with a suppressed carrier wave signal, the latter pertaining to color information and having a frequency corresponding to an odd multiple of half the line scanning frequency, to produce respectively a modulated carrier wave brightness information component and a suppressed carrier wave color information component, and coupling means for applying said components to said conductive network, the provision of means for producing said electric wave and frequency control means for establishing the frequency of said electric wave at a whole multiple of the line scanning frequency plus or minus an odd multiple of one quarter of the frame scanning frequency, the beats arising due to second and fourth order distortions of the carrier waves of said components during their passage through said conductive network thereby occurring at frequencies such that in a picture produced with the aid of said components said beats form a dot pattern.

4. A color television transmitting apparatus according to claim 3, further including a radio wave receiving device to derive from a received color television transmission brightness information signals and suppressed carrier wave signals pertaining to color information and means for applying said brightness information signals and said carrier wave signals to said modulator means.

5. A color television transmitting apparatus according to claim 4, with a predetermined frame scanning frequency, still further including an electric wave oscillator having an oven-controlled crystal drive to provide said electric wave at a frequency corresponding to a whole multiple of the line scanning frequency plus or minus an odd multiple of one quarter of the frame scanning frequency of the television transmission concerned.

References Cited

UNITED STATES PATENTS 3,275,742 9/1966 Quinton et al. ........ 178—5.4

OTHER REFERENCES

Fink: Television Engineering Handbook, McGraw-Hill, New York, 1957. Pp. 9–16 to 9–18 relied on.

JOHN W. CALDWELL, *Acting Primary Examiner.*

J. A. O'BRIEN, *Assistant Examiner.*